P. E. MARUGG.
CHURN.
APPLICATION FILED MAY 6, 1909.

945,402.

Patented Jan. 4, 1910.
3 SHEETS—SHEET 1.

Inventor
Paul E. Marugg.

P. E. MARUGG.
CHURN.
APPLICATION FILED MAY 6, 1909.
945,402.
Patented Jan. 4, 1910.
3 SHEETS—SHEET 2.
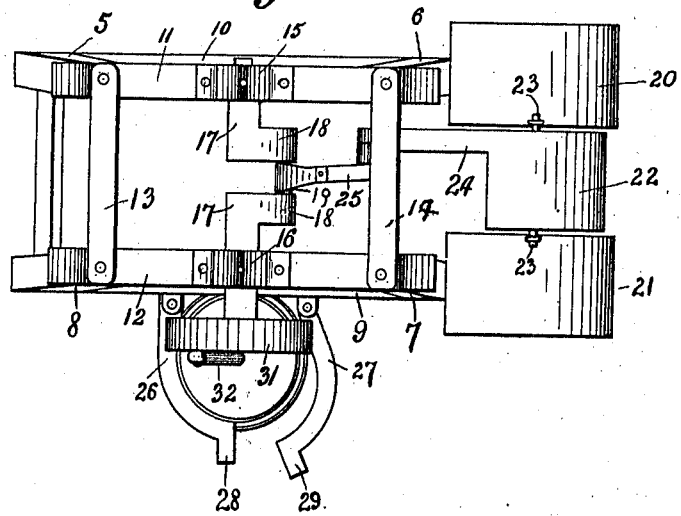
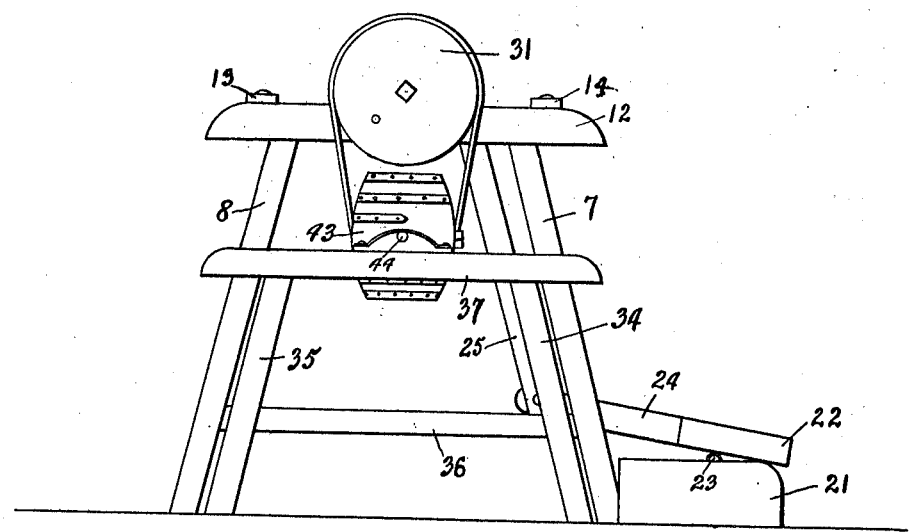

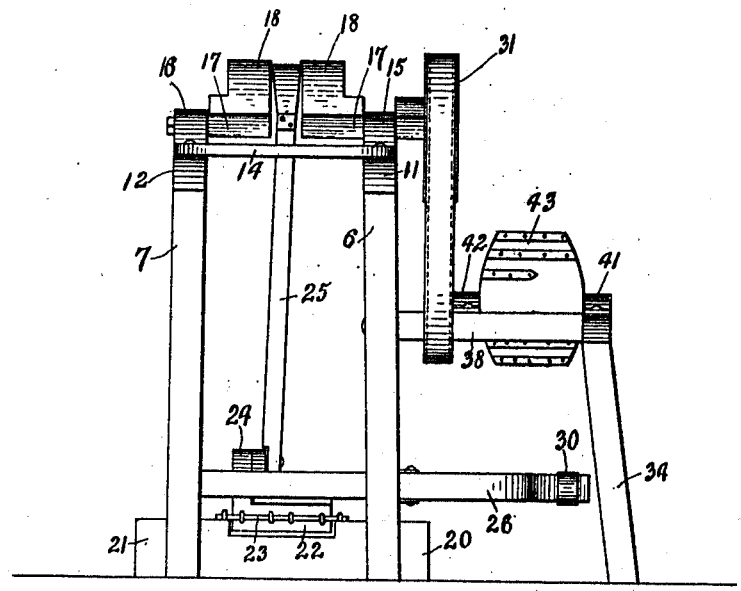

UNITED STATES PATENT OFFICE.

PAUL E. MARUGG, OF DENVER, COLORADO.

CHURN.

945,402.  Specification of Letters Patent.  Patented Jan. 4, 1910.

Application filed May 6, 1909. Serial No. 494,376.

*To all whom it may concern:*

Be it known that I, PAUL E. MARUGG, a citizen of the United States, residing at Denver, in the county of Denver, State of Colorado, have invented certain new and useful Improvements in Churns; and I do hereby declare the following to be a full, clear, and exact description of the invention, such as will enable others skilled in the art to which it appertains to make and use the same.

This invention relates to improvements in operating devices for churns, and has for one of its objects the provision of a device of that kind which is adapted to operate churns of the reciprocating and rotary types.

Another object is the provision of an improved form of clamping or holding member for the churn body.

A further object is the provision of an improved form of holding frame for a rotary churn. And a still further object is the provision of a churn holding frame which may be readily attached and detached to the operating frame.

With these and other objects in view as will more fully hereinafter appear, the present invention consists in certain novel details of construction and arrangement of parts, hereinafter fully described, illustrated in the accompanying drawings and more particularly pointed out in the appended claims, it being understood that various changes in the form, proportion, size and minor details of the device may be made without departing from the spirit or sacrificing any of the advantages of the invention.

Figure 1:
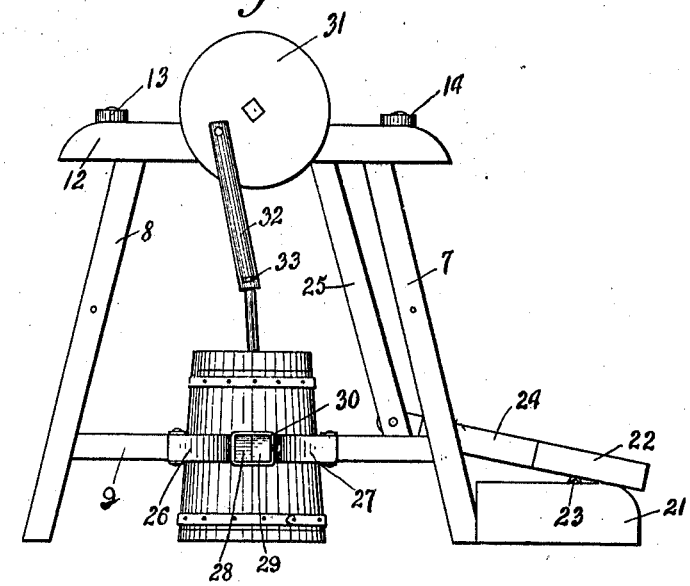
Figure 2:
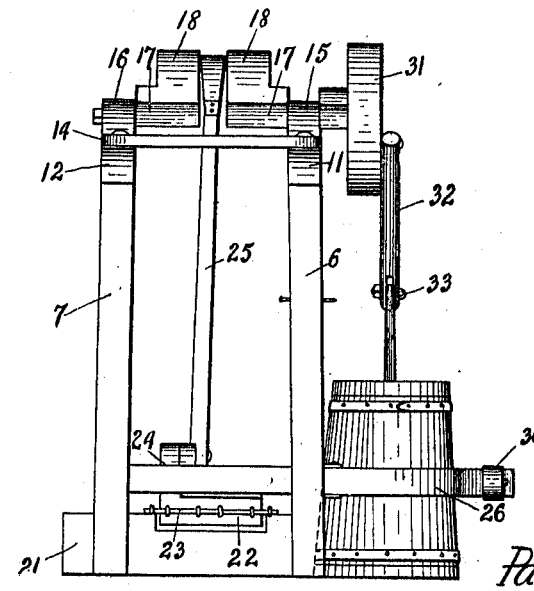

In the accompanying drawings forming part of the specification:—Figure 1 is a side elevation of the device showing the same applied to a churn having a reciprocating dasher. Fig. 2 is an end view of the same. Fig. 3 is a plan view showing the clamping or holding device in open position. Fig. 4 is a side elevation showing the rotary churn attachment. Fig. 5 is an end view of the same. Fig. 6 is a sectional end view of the rotary churn attachment. Fig. 7 is a detailed perspective of the detachable pulley and shaft operating the rotary churn.

Similar numerals are employed to designate corresponding parts throughout.

The operating frame consists essentially in four or more spaced uprights designated by the numerals 5, 6, 7 and 8, the lower end portions of which are connected by the horizontally disposed braces 9 and 10. The uprights are inclined inwardly and at their upper ends are connected by the cross pieces 11 and 12 and connection between the latter is established by means of the braces 13 and 14. Disposed at the intermediate portions of the cross pieces 11 and 12 are boxings 15 and 16, and journaled in these boxings are the opposite ends of a crank shaft 17. The intermediate portion of the crank shaft is provided with hangers 18 and the usual wrist pin 19. Extending forwardly from the up-rights at one end of the frame is a raised platform comprising a pair of spaced blocks 20 and 21. A treadle in the present instance is shown as consisting of a flat portion 22 having on its lower face a transversely disposed shaft 23, the opposite ends of which are journaled in the blocks 20 and 21. Projecting from one end of the flat portion 22 is a finger 24 and connection between the finger and wrist pin 19 is established by means of the connecting rod 25. Combined with one of the side braces at the lower end portions of the up-rights is a churn body clamping member. This element in the present instance is shown to consist of two sections 26 and 27, one of which is rigidly secured to the outer face of the brace 9 and the other section is pivoted to the brace 9 sufficiently far from the first-named section so that when their outer ends are brought together an opening will be presented sufficient to accommodate the ordinary churn body.

The clamping sections are preferably formed of two pieces of bar metal and are each semi U shaped. At their outer or free ends they are provided with lateral projections 28 and 29 which are designed to bear one upon another when the sections are brought together. These sections are provided with a collar 30 which is designed to encircle the projections when the sections are brought together and thus completely lock the same as shown in the drawings.

Formed integral or keyed to one end of the crank shaft 17 is a pulley 31 which is disposed in a vertical plane parallel to the frame and directly above the churn body clamping device.

As shown in Figs. 1 and 2 of the drawings when the device is to be used in connection with a reciprocating churn the body of the latter is first placed within the clamping device and then suitable connection between the dasher and pulley 31 is established by means of a pitman 32 journaled on an eccentrically disposed pin on the outer face of the disk. Thus it can be seen by operating the treadle in the usual way that the oscillations of the latter and connecting rod will impart a rotary movement to the disk which in turn will impart through the pitman 32 a reciprocating movement to the dasher, it being understood that connection between the latter and pitman is established by means of a pivot pin 33 which extends through the bifurcated lower end of the pitman 32 which receives the upper end of the dasher.

When it is desired to use the device just described, in connection with a rotary churn the following construction is employed: By referring now to the drawings, it will be seen that a holding frame is shown to consist of a pair of spaced uprights 34 and 35, the lower end portions of which are connected by a horizontally disposed brace 36, and the upper extremities of which are connected by a cross piece 37. A pair of head posts 38 are secured at the opposite ends of the cross piece 37 and are disposed at right-angles thereto. The outer end portions of the head posts 38 are connected by a cross piece 40 spaced from and parallel with the cross piece 37. The height of the up-rights 34 and 35 is considerably less than that of the up-rights of the operating frame and threaded into the up-rights 5 and 6 of the latter and at substantially their intermediate portions are wood screws, the threaded ends of which project beyond that side of the frame upon which the pulley 31 is disposed, the inner ends of the head posts 38 are provided with threaded sockets which are designed to receive the extremities of the wood screws, it being understood that the height of the up-rights 34 and 35 is sufficient to bring the sockets on the inner extremities of the head posts in alinement with the screws. The cross pieces 37 and 40 are at their intermediate portions provided with boxings 41 and 42 which receive the trunnions of the rotary churn 43. In the present construction one of these trunnions is shown to consist of a shaft 44, the inner end of which terminates in a flattened base 45 which is slightly concaved to conform to the configuration of the churn body and is provided with openings for the reception of screws by means of which it is secured to the body, and its free end is provided with a disk or pulley 46 which, owing to the disposition of the parts, will lie in a vertical plane with the pulley 31. When the parts are in position, as shown, a suitable belt or the like may be employed to establish connection between the pulleys, so that when the treadle is operated, as before described, rotary movement will be imparted to the churn body.

From the foregoing it can be seen that I have provided a device which is simple in structure and comparatively inexpensive to manufacture and which will be greatly appreciated by those employing both reciprocating and rotary churns. It can be seen with the aid of the shaft 44 and disk that by means of the flaring base the device can be readily attached to most forms of rotary churns now in use. This in itself is an advantage over devices of this kind heretofore in use, wherein it became necessary to change the construction of the entire churn in order to adapt it to a form of operating device.

Having thus described my invention, what is claimed as new, is:—

1. A churn operating device comprising a frame formed of spaced and inwardly inclined up-rights, connected together at their upper ends by horizontally disposed cross pieces, a crank shaft journaled in said cross pieces, a pulley on one end of said crank shaft disposed beyond the vertical plane of the frame, a churn holding device detachably combined with said frame, and a pulley on said churn holding device in alinement with the first-named pulley, a connecting rod having one end journaled on the crank shaft, and the treadle pivoted at one end of the frame having a tongue portion pivoted to the opposite end of the connecting rod.

2. A churn operating device comprising a frame formed of spaced up-rights connected together at their upper ends by horizontally disposed cross pieces, a crank shaft journaled in said cross pieces, a pulley on one end of said shaft disposed beyond the vertical plane of the frame, a churn holding frame having its inner end portion detachably secured to the operating frame, a shaft journaled in said churn holding frame and a pulley at the outer end of said shaft in alinement with the first-named pulley, a connecting rod having one end journaled on the crank shaft and a treadle pivoted at one end of the frame having a tongue portion pivoted to the opposite end of the connecting rod.

3. A churn operating device comprising a frame, formed of spaced uprights connected together at their upper ends by horizontally disposed cross pieces, a crank shaft journaled in said cross pieces and having one end extending beyond the vertical plane of the frame and provided with a pulley, a churn holding device combined with said frame and disposed below said pulley, a churn arranged in the churn holding device, a connection between said pulley and churn, a connecting rod having one end journaled on the crank shaft, a platform at one end of said frame provided with a recess, a treadle disposed within said recess having a transversely disposed shaft journaled in the opposite sides thereof, said treadle being further provided with a tongue portion pivoted to the opposite end of the connecting rod.

In testimony whereof, I affix my signature, in presence of two witnesses.

PAUL E. MARUGG.

Witnesses:
 RAY W. LESLIE,
 DON F. COWELL.